J. V. SCHMID & C. MASON.
VALVE.
APPLICATION FILED DEC. 23, 1909.
1,028,497.
Patented June 4, 1912.
3 SHEETS—SHEET 1.
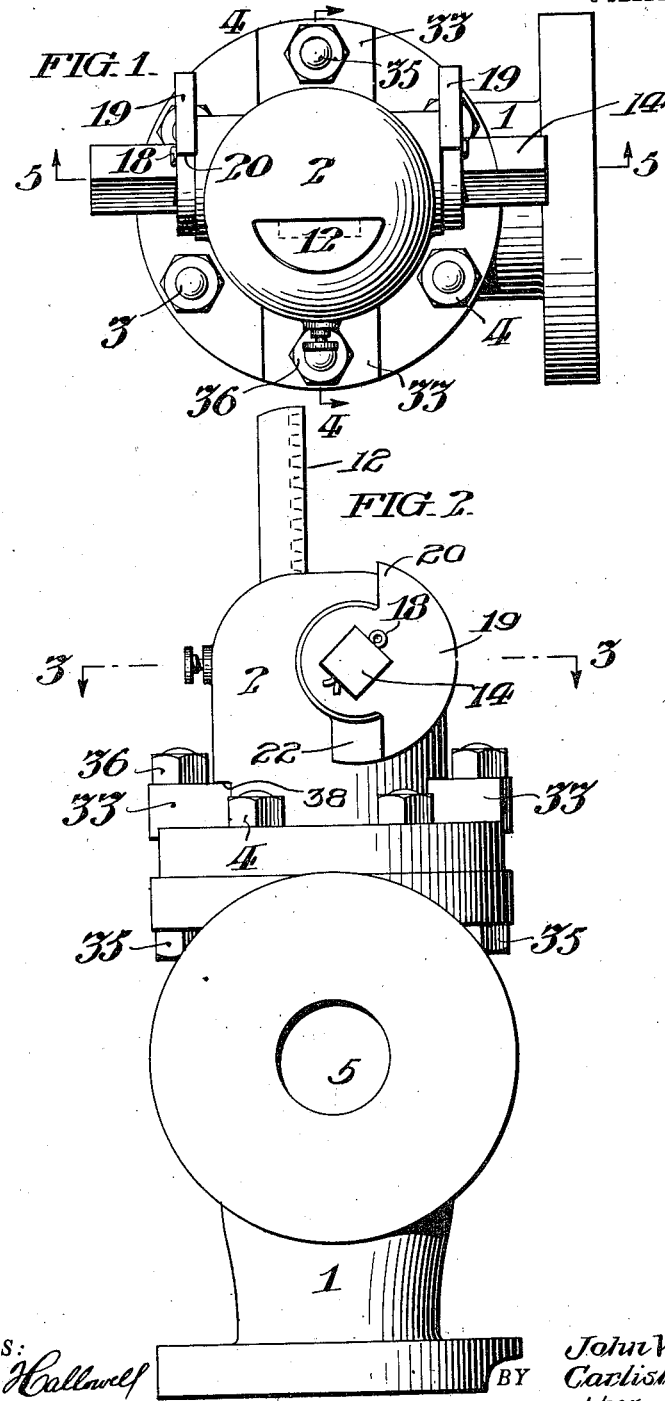
WITNESSES:
INVENTORS
John V. Schmid
Carlisle Mason,
BY
ATTORNEY.

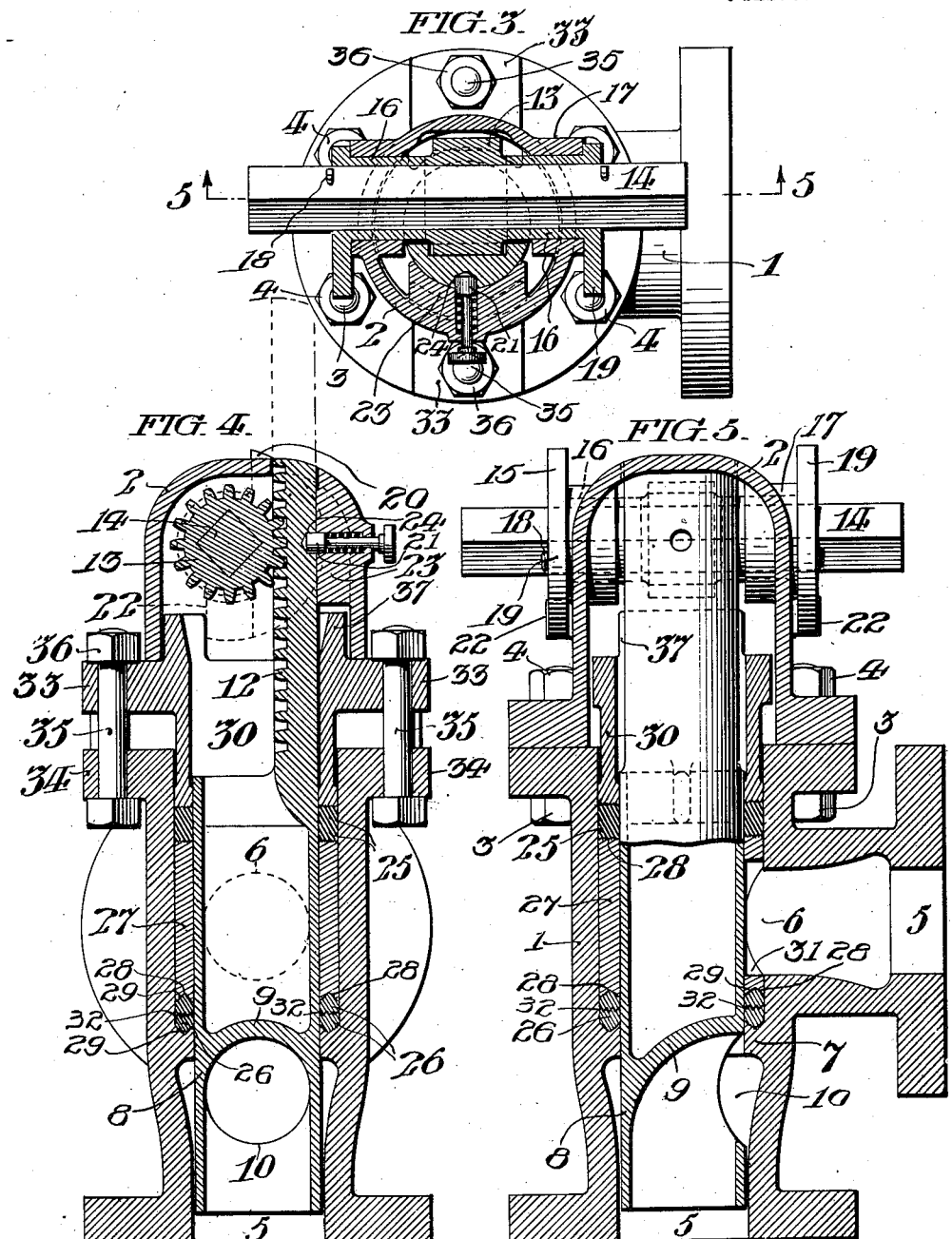

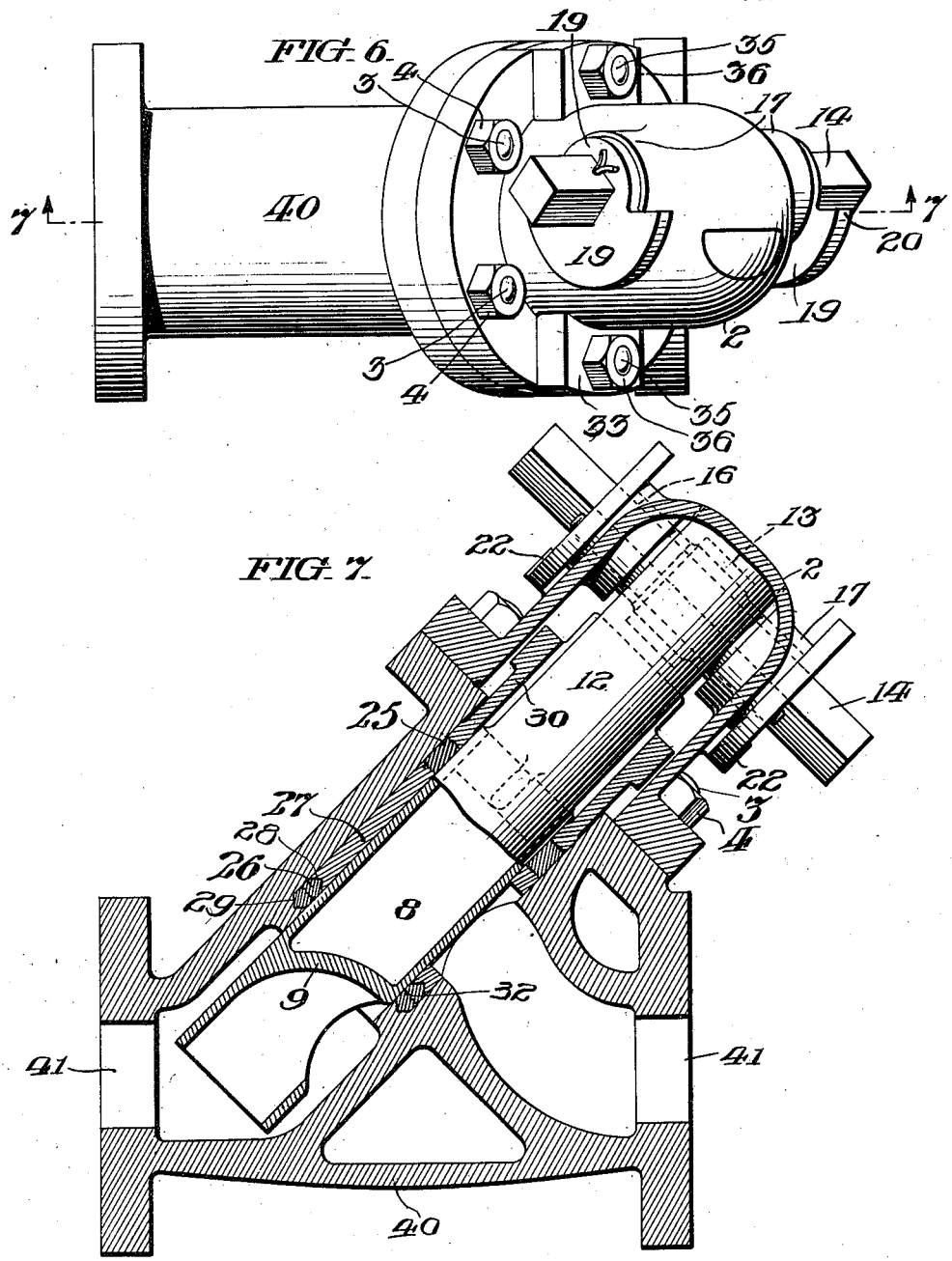

UNITED STATES PATENT OFFICE.

JOHN V. SCHMID, OF PHILADELPHIA, AND CARLISLE MASON, OF WYNDMOOR, PENNSYLVANIA, ASSIGNORS TO NELSON VALVE COMPANY, A CORPORATION OF PENNSYLVANIA.

VALVE.

1,028,497.  Specification of Letters Patent.  Patented June 4, 1912.

Application filed December 23, 1909. Serial No. 534,612.

*To all whom it may concern:*

Be it known that we, JOHN V. SCHMID, a citizen of the United States, and a resident of Philadelphia, county of Philadelphia, and State of Pennsylvania, and CARLISLE MASON, a citizen of the United States, and a resident of Wyndmoor, county of Montgomery, and State of Pennsylvania, have invented certain new and useful Improvements in Valves, of which the following is a specification, reference being had to the accompanying drawings.

This invention particularly relates to blow-off valves, and its principal objects are to provide such a valve with means arranged to prevent the too sudden admission of pressure to the line of pipe controlled by said valve, and conveniently effected by a piston provided with a port arranged to register with a port in the valve casing, and so arranged that the actuation of said piston to open said valve effects a gradual increasing flow of fluid through said ports; to provide means to visibly ascertain the position of said piston relative to said casing; means arranged to reciprocate said piston; means arranged to limit the movement of said piston; and means arranged to prevent the relative rotation of said piston and the casing members.

The form of this invention hereinafter described provides a valve casing having a port, a reciprocatory piston having a port arranged to register with the port in said casing and provided with an extension including a rack, a pinion engaged with said rack arranged to shift said piston to open and close said ports, packing for said piston, a sleeve surrounding said piston and provided with an aperture in registry with the port in said casing and arranged to separate said packing to maintain the same on opposite sides of said port, a gland arranged to adjust said packing and provided with lugs extended to cover the openings in said casing when said gland is shifted, the surfaces of said gland and sleeve which contact with said packing being serrated or otherwise roughened to prevent relative rotation, which thereby holds said sleeve in such position that its aperture is maintained in registry with the port in said casing. A polygonal shaft is provided for said pinion, said shaft being provided with hubs forming trunnions therefor, conveniently mounted for rotation in suitable bearings in said casing, and having disks provided with shoulders arranged to engage lugs on said casing to limit the extent of rotation of said pinion.

Our invention further includes the various novel features of construction and arrangement hereinafter more definitely specified.

In the accompanying drawings, Figure 1 is the plan view of a convenient embodiment of our invention as applied to an angle valve, said valve being shown in open position; Fig. 2 is an end elevation of the valve shown in Fig. 1 as seen from the right-hand end of said figure; Fig. 3 is a plan sectional view of the valve shown in closed position taken on the line 3—3 in Fig. 2; Fig. 4 is a central vertical sectional view of the valve in closed position taken on the line 4—4 in Fig. 1; Fig. 5 is a central vertical sectional view of the valve shown in closed position taken on the lines 5—5 in Figs. 1 and 3, certain of the parts being shown in elevation for convenience of illustration; Fig. 6 is a plan view of a convenient embodiment of our invention as applied to a valve whose inlet and outlet openings are in alinement; and Fig. 7 is a central vertical longitudinal sectional view taken on the line 7—7 in Fig. 6, certain of the parts being shown in elevation for convenience of illustration.

In said drawings, the valve casing 1 includes the hood 2, removably connected therewith by bolts 3, having nuts 4, and is provided with the inlet and outlet openings 5, the port 6 and the annular shoulder 7 forming a ledge, which latter serves as a bearing or guide for the reciprocatory piston 8, having the curved wall 9 arranged to direct fluid through the port 10, when in registry with the port 6 in the casing 1. Said piston is provided with an extension, including the rack 12 extending through the hood 2 and arranged to be engaged by the pinion 13 within the hood 2, having the polygonal shaft 14 in removable relation therewith extending exterior to said hood for convenient manipulation by a suitable wrench or key, and provided with hubs 16 which serve as trunnions for said shaft 14 and which are mounted in suitable bearings 17 in said hood 2. The hubs 16 are removable from the shaft 14 and are conveniently retained on said shaft 14 by the cotter pins 18, and are provided with disks 19 having shoulders 20 arranged to engage the lugs 22 projecting from the hood 2 to limit the rotation of said shaft and pinion, and consequently the movement of the piston 8. As best shown in Fig. 4, a suitable guide or bearing 23 is formed integral with the hood 2, arranged to maintain the rack 12 in alinement, and in engagement with the pinion 13. As shown in Fig. 3, the hubs 16 are extended inwardly and are abutted against the pinion 13 and retain said pinion centrally disposed.

The reciprocatory piston 8 is arranged to be locked in closed position by the detent bolt 21, which is spring-pressed into the aperture 24 in said piston, to prevent its being accidentally shifted by a back pressure effected in the discharge outlet 6 by the discharge of other valves connected with the same line of pipe. Packing rings 25 and 26 surround the piston 8 respectively above and below the port 6, and are separated by the spacing sleeve 27, which is provided at its opposite ends with serrations 28 arranged to rigidly engage said packing, which when compressed by the gland 30 is pressed into the interstices of said serrations and prevents a relative rotation of the sleeve 27, and thereby maintains the aperture 31 in said sleeve in alinement with the port 6.

The opposed faces of the shoulder 7 and the sleeve 27 are provided with V-shaped circular grooves 29, in which the packing 26 is held to prevent its being forced laterally and displaced by the pressure leaking between the valve body 1 and the sleeve 27, when the top edge of the port 10 is raised above the lower edge of the packing 26, and said packing may be formed of fibrous material, reinforced by metallic pieces 32, of any convenient form, preferably corrugated.

The gland 30 is provided with opposed lateral wing flanges 33, connected with the flange 34 by bolts 35 and is conveniently adjusted with respect to the casing 1 by nuts 36, and said gland is further provided with the upwardly extending lugs 37, forming shields arranged to close the apertures formed between the upper surface of the flanges 33 and the lower edge of the recess 38 in the hood 2, through which said flanges 33 extend, when said gland is adjusted downwardly to compress the packing 25 and 26.

As may be readily seen, the shaft 14 may be conveniently rotated by being engaged exterior to the hood 2 by a wrench, key, or any other suitable device to rotate the pinion 13 and thereby shift the piston 8 to register its port 10 with the port 6 in said casing, as in Figs. 1 and 2, or to close said valve as shown in Figs. 3 to 7, inclusive. As shown in Fig. 2, it may be noted that the position of the piston with respect to the casing may be determined by the extent of the rack 12 projecting through the hood 2.

It may be observed that by the construction herein shown and described, the valve parts are readily assembled or taken apart by simply removing the cotter pin 18 and withdrawing the shaft 14. The piston 8 may be withdrawn through the lower opening 5 of the valve casing 1, and by removing the gland 30, the packing 25, spacing sleeve 27 and packing 26, may be conveniently removed and replaced.

In the form of our invention shown in Figs. 6 and 7, the valve casing 40 is arranged to be included in a straight line of pipe and has the opposed inlet and outlet openings 41 in alinement, and the piston 8 is disposed in angular relation with respect to the axis of said openings; in other respects said valve is identical with the form illustrated in Figs. 1 to 5, inclusive.

In a valve constructed as above described, the ports are gradually opened, which prevents the sudden passage of fluid therethrough, and by such construction as herein shown, the opening of the ports, which are unobstructed when open, is greatly facilitated, and effected more rapidly than by the usual type of valve, wherein a hand-wheel is rotated to effect the rotation of a threaded stem.

We do not desire to limit ourselves to the precise details of construction and arrangement herein set forth, as it is obvious that various modifications may be made therein without departing from the essential features of our invention as defined in the appended claims.

Having thus described our invention, we claim:

1. A valve comprising a casing, having a serrated grooved ledge for the reception of packing, and a gland having a serrated grooved face opposed to said ledge, and relatively adjustable with respect thereto.

2. In a valve, the combination with a casing provided with openings, of a valve member movable in said casing, and a packing gland having portions respectively extending through said casing, and covering said openings.

3. A valve comprising a casing having a port, a piston mounted in said casing, having a port arranged to register with the casing port, and provided with a toothed extension having its end flush with said casing in closed position, and arranged to project through said casing in open position, means within said casing arranged to engage said extension to shift said piston, the teeth of said extension indicating the position of said piston.

4. In a valve, the combination with a casing provided with a passageway, of a piston arranged to control said passageway, packing for said piston, a separating sleeve surrounding said piston and arranged to space said packing, and a gland having flanges extended through said casing arranged to adjust said packing.

5. In a valve, the combination with a casing having suitable ports and openings, of means movable to close said ports, packing surrounding said means, and a gland arranged to adjust said packing and provided with shields arranged to cover the openings in said casing.

6. In a valve, the combination with a valve casing, of a piston in said casing provided with a rack, having teeth extended toward the axis of said piston, a concave bearing guide in said valve casing for said rack, and a pinion opposed to said guide, arranged to engage said rack to shift said piston.

7. In a valve, the combination with a casing provided with suitable ports and openings, of a piston operative to control said ports, packing surrounding said piston, and a gland arranged to adjust said packing and provided with shields within said casing, to cover said openings.

8. In a valve, the combination with a casing provided with a guide and openings, of a piston mounted in said guide, packing for said piston, a spacing sleeve surrounding said piston and provided with serrated ends arranged to engage said packing to prevent its relative rotation, and a gland arranged to adjust said packing and provided with upwardly extending lugs arranged to cover the openings in said casing.

9. In a valve, the combination with a casing provided with openings, of a piston mounted in said casing, packing for said piston, and a gland having flanges extending through said casing and provided with upwardly extending lugs arranged to cover the openings in the casing through which said flanges extend.

10. In a valve, the combination with a casing, including a hood having openings, of a piston mounted to reciprocate in said casing, a packing for said piston, and a gland having opposite flanges extending through the openings in said hood and provided with upwardly extending lugs arranged to cover the openings in said hood through which said flanges extend.

11. A valve comprising a casing having a flange, and a hood having a flange rigidly connected with the flange of said casing, and having openings therein, packing for said valve, and a gland arranged to adjust said packing and having flanges extended through the openings in said hood and adjustable with respect to the flanges of said casing and hood, said gland being provided with shields extended to close the openings through which said gland flanges extend.

12. In a valve, the combination with a casing, of a piston mounted to reciprocate in said casing to control said valve, a shaft connected to shift said piston, and hubs forming the trunnions for said shaft arranged to rotate in said casing, and having disks provided with shoulders arranged to limit the rotation of said shaft.

13. In a valve, the combination with a casing, of a piston arranged to reciprocate in said casing and having a rack extending therethrough, a pinion arranged to engage said rack to shift said piston, a polygonal shaft for said pinion, and hubs suitably journaled in said casing arranged to carry said shaft and provided with means arranged to limit the rotation of said shaft.

14. In a valve, the combination with a casing, of a piston arranged to control said valve and provided with a rack, a pinion connected with said rack to shift said piston, hubs forming the trunnions for said pinion mounted to rotate in said casing, and having abutments arranged to limit the rotation of said pinion, and means on said casing arranged to be engaged by said abutments.

15. In a valve, the combination with a casing having a passageway extending therethrough, of a piston arranged to control said passageway and provided with a rack extending through said casing, a pinion arranged to engage said rack to shift said piston, a polygonal shaft for said pinion, hub members forming the trunnions for said shaft and mounted for rotation in said casing, means arranged to limit the rotation of said shaft, and means arranged to retain said hub members on said shaft.

16. In a valve, the combination with a casing having a passageway, of a piston provided with a rack, a guide for said rack, a pinion opposed to said guide arranged to engage said rack to shift said piston, and hub members arranged to maintain said pinion on said shaft in alinement with said rack and provided with means arranged to limit the rotation of said shaft and to form the trunnions for said shaft suitably journaled in said casing.

17. A valve comprising a casing having a port, a piston having a port arranged to register with the port in said casing and provided with a rack, a pinion engaged with said rack to shift said piston, and a slide bolt tending to press said rack toward said pinion, and arranged to engage said piston and automatically lock it in a predetermined position.

18. A valve having a V-shaped packing seat, a sleeve having an opposed V-shaped packing seat, a valve piston, and packing disposed between said seats and surrounding said piston, the inner walls of said packing seats extending angularly to said piston.

19. A valve comprising a casing having a

V-shaped packing seat formed therein, a sleeve having an opposed V-shaped packing seat, packing disposed between said seats, and crimped metallic pieces disposed in said packing, in a plane intersected by the diverging walls of said V-shaped seat.

20. A valve having a bore and a V-shaped packing seat provided with a serrated facing surrounding said bore, a sleeve having an opposed V-shaped packing seat provided with a similar serrated facing, and packing disposed between said seats, the inner walls of said seats extending obliquely and forming an acute angle with the walls of said bore.

21. A valve having an aperture and a V-shaped packing groove, a sleeve having an opposed V-shaped packing groove, packing disposed in said grooves, and means for compressing said packing therein, the walls of said aperture and said grooves forming a sharp edge.

22. A valve having an aperture, and a recess forming a groove, a sleeve having an opposed recess forming a groove, packing disposed in said grooves, and means for compressing said packing therein, the walls of said aperture and said grooves forming a sharp acute edge in a plane transverse to the axis of said sleeve.

23. A valve having a wall, and a packing groove whose surface extends in angular relation to said wall and forms a sharp acute circular edge therewith.

24. A valve comprising relatively movable members having their opposed faces provided with grooves whose walls diverge and form a sharp acute curved edge.

In witness whereof, we have hereunto set our hands this twenty-first day of December, A. D., 1909.

JOHN V. SCHMID.
CARLISLE MASON.

Witnesses:
ALEXANDER PARK,
ROBERT H. CRAWFORD.